US006935986B2

(12) United States Patent
Hvolka et al.

(10) Patent No.: US 6,935,986 B2
(45) Date of Patent: Aug. 30, 2005

(54) TWO SPEED GEARBOX

(75) Inventors: Dusan J. Hvolka, Salt Lake City, UT (US); Steve G. Pitts, Coffeyville, KS (US); Cary D. Pitts, Coffeyville, KS (US)

(73) Assignee: Darwin Industries, Inc., Coffeyville, KS (US)

( * ) Notice: Subject to any disclaimer, the term of this patent is extended or adjusted under 35 U.S.C. 154(b) by 376 days.

(21) Appl. No.: 10/233,137

(22) Filed: Aug. 30, 2002

(65) Prior Publication Data

US 2004/0266576 A1 Dec. 30, 2004

Related U.S. Application Data

(60) Provisional application No. 60/358,219, filed on Feb. 20, 2002.

(51) Int. Cl.⁷ .................................................. F16H 3/44
(52) U.S. Cl. ...................................................... 475/322
(58) Field of Search .................................. 475/322, 146

(56) References Cited

U.S. PATENT DOCUMENTS 5,024,636 A  *  6/1991  Phebus et al. .............. 475/141

* cited by examiner

Primary Examiner—Dirk Wright
(74) Attorney, Agent, or Firm—Marcus G. Theodore

(57) ABSTRACT

A two speed gear box including a casing that is rotatably supported by a central planetary gear carrier. The two speed gear box further includes a central mounted planetary gear assembly with a ring gear controlled by a low speed clutch and a sun gear controlled by a high speed clutch that cooperate to provide three modes of operation for the output shaft with respect to a drive axle. The three modes of operation include a neutral mode, a high speed mode and a low speed mode. Selective engagement and disengagement of the low speed and high speed clutches provide for selection of one of the modes of operation.

19 Claims, 13 Drawing Sheets

TWO SPEED GEARBOX

RELATED APPLICATIONS

This application is a continuation-in-part of the provisional application entitled "Two Speed Hydraulically Actuated Gearbox with Static Actuating Pistons", Ser. No. 60/358,219 filed Feb. 20, 2002.

BACKGROUND OF THE INVENTION

1. Field

The present invention relates generally to gearboxes, and more particularly, to a universal two speed gearbox for driving drilling machines, digging and transport vehicles, and other devices which require variable operating two speed bearing thrust.

2. State of the Art

A number of gearboxes and transmission wheel hubs are known. For example, Buuck et al., U.S. Pat. No. 5,478,290 discloses a two speed high shift transmission residing within a rotatable wheel hub. It has dual hydraulic clutches to activate select gears of a planetary gear set including a first sun gear, a first planet gear, a first planet carrier and an inner ring gear. The first planet carrier includes a gear, which drives a second planetary gear set resulting in rotation of a wheel hub. When the first clutch is engaged, the inner ring gear is locked to a stationary outer ring effecting a high ratio reduction. When pressure to the first clutch is removed and applied to the second clutch, said first clutch disengages and said second clutch engages the sun gear and the planet carrier locking them together so that the sun gear, planet gear and planet carrier and inner ring gear rotate in unison effecting a low ratio reduction. Buuck et al may also incorporate a second planetary gear system operably associated with the hub to be selectively be engaged. The Buuck invention requires exterior dynamic seals, which are subject to leakage, and is subject to large clutch or brake forces exerted upon rotary bearings. This requires large design of the transmission and bearings to withstand such clutch and brake forces Blanchard, U.S. Pat. No. 4,331,432 discloses a two speed automatic transmissions for marine propulsion. It employs an hydraulically actuated two speed transmission with a single fluid multi-pressure actuated clutch for activating different output shafts. (list any deficiencies or limitations in usage, etc.)

Brandt et al, U.S. Pat. No. 5,006,100 discloses a two-speed planetary gear mechanism employing an hydraulically actuated piston to activate the ring gear of a planetary gear system in either one or two directions. It does not employ a clutch for smoother operation.

Nelson, U.S. Pat. No. 6,350,165B1 discloses a marine stern drive two-speed automatic transmission employing a planetary gear apparatus including two hydraulic clutches and a ring gear brake to provide two forward drive ratios, a reverse ratio, or a neutral ratio. In another embodiment, a third hydraulic clutch is included with bevel gears alone to provide two forward and reverse speeds.

Legner, U.S. Pat. No. 5,509,860 discloses a power shift two-speed epicyclical gear box employing two hydraulically engaged friction clutches, which are alternatively engaged and disengaged by the force exerted by plate springs or hydraulic pistons. An accumulator and a check valve system are associated with the pressure chambers of the friction clutches to improved the shifting quality, particularly when downshifted from second to first gear.

Ahlen, U.S. Pat. No. 4,178,814 discloses a two-speed gear transmission employing a direct drive connectable clutch wherein the input and output shafts rotate together and a second gear drive namely overdrive or under drive have one of the sun or ring hears held stationary by a brake relative to the casing.

Co-applicant, Dusan Hvolka's co-pending filing with Strong et al. entitled "Two Speed Gearbox" discloses a two speed planetary gearbox activated by inboard and outboard clutches each associated with its own separate planetary gear system located and controlled in the wheel hub of the axle. In the low range, it employs a static clutch. In the high range it employs a dynamic clutch sealed with dynamic seals, which leak as the pressure increases; thereby requiring at high pressures a pump to remove excess fluids.

Other two speed shiftable gearboxes have short bearing lives when the two speed gearbox is operated for long periods of time in high range. This is because there is a large thrust load on the thrust bearing between the High Range Apply Piston and the High Clutch. All applications will be torque limited in the high range due to the limitations of the input horsepower. This results in a lower required input torque as the input speed to the box increases. Since the required thrust load through the bearing is directly proportional to the torque, and since the life of the bearing is a function of the thrust load, an increase bearing life will result from reducing the thrust load on the bearing The invention described below provides an improved two speed gearbox activated with a non-rotating piston used to apply the force required to activate the high-speed clutch using a locking pin and a thrust bearing to allow the piston to secure the sun gear of a planetary gear system to remain in a high operating range, and a second low-speed clutch securing the ring gear of the planetary gear system in the low operating range.

SUMMARY OF THE INVENTION

The invention comprises a two speed gearbox, which provides a static gearing system that will actively lower the thrust on support bearings by reducing the apply pressure to the clutch. The two speed gearbox includes a casing adapted to journal mount about a splined input drive shaft and a splined output shaft with coupling structure on either side of a central planetary gear mount assembly. The central planetary gear carrier mount assembly comprises: a sun gear driven by the drive shaft; a plurality of planetary gears; a ring gear; and a planetary gear carrier, the planetary gear carrier supporting and interconnecting the planetary gears. A low speed clutch is mounted to the gearbox casing and adapted to selectively engage the rotating ring gear of the central planetary gear assembly via an engaging/disengaging low speed piston affixed to the casing.

A high speed clutch adapted to selectively engage with the sun gear of the planetary gear assembly is attached to the gearbox casing on the other side of the planetary gear assembly. An engaging/disengaging high speed piston is operably associated with the high speed clutch plates having a locking pin to secure the sun gear assembly to the casing to prevent slippage. It is selectively activated to secure the sun gear of the planetary gear carrier when engaged.

The high speed and low speed clutches are activated with selective activation means, such as an hydraulic circuit, to selectively activate the desired high speed and/or low speed pistons to provide the desired output operating speed mode to the output shaft. Selective engagement of the above components of the planetary gear assembly defines a plurality of operating modes:

a neutral mode defined by disengaging both the low speed clutch and the high speed clutch;

a low speed mode defined by engaging the low speed clutch and disengaging the high speed clutch; and a high speed mode defined by disengaging the low speed clutch and engaging the high speed clutch.

Preferably, at least one of the low speed clutch and the high speed clutch is adapted to be engaged and disengaged automatically.

The two speed gearbox may be associated with a drive axle driven by a hydrostatic drive system, an electric motor, or a combustion engine. In one preferred embodiment, the carrier mount houses the planetary gear assembly to be engaged by the clutch assemblies. The carrier mount preferably has a generally cylindrical interior surface, a portion of the exterior surface defining the ring gear of the planetary gear assembly.

The two speed gearbox has a plurality of planetary gears of the planetary gear assembly carrier mount operatively connected to the sun gear of the planetary gear assembly, such that the sun gear rotates about a drive axis, in conjunction with the gear carrier of the planetary gear assembly. The ring gear of the planetary gear assembly forms a portion of the carrier mount and provides a two speed gear box with a gear ratio of between approximately 2 to 3.6, when a single planetary gear assembly carrier is employed and is driven by the outputs provided by its planetary gears.

For higher gear ratios greater than 3, instead of relying solely on the output generated by a single set of planetary gears, the two speed gear box includes a carrier mount with a dual segmented planetary gear assembly adapted to rotate within the ring gear in a similar fashion to the single planetary gear assembly. Said carrier mount includes dual planetary gears having differing gear segments, each with differing gear ratios, which are then selectively activated and driven by the sun gear to provide the desired output gear ratio. The dual planetary gear higher gear ratio segment, when activated, provides a gear ratio in excess of 3. The dual planetary gear lower gear ratio segment, when activated, provides a gear ratio between 2 and 3.

The two speed gearbox may be adapted to either reduce or increase outputs by reversing the gearbox input and output ends via universal end plate coupling structure adapted to attach either end of the gearbox assembly to the input drive shaft. These couplings are preferably splined to accommodate splined input and output shafts to prevent slippage. Thus adapted, either an increasing or decreasing torque output is provided by the two speed gearbox.

The two speed gearbox employs one stationary and one dynamic clutch to selectively activate either the ring gear or sun gear of the central planetary gear assembly and provides three modes of operation. The dynamic clutch employs an angular contact bearing permitting the use of a stationary piston. As these pistons are stationary, they do not require dynamic seals, which are subject to the extensive leakage problems encountered by other dynamic clutches.

Hydraulic or mechanical activating means, such as an hydrostatic drive system, are associated with the low speed and high speed clutch assemblies to selectively activate the desired clutch assembly to secure the desired sun gear or ring gear to provide the desired gear ratio drive output. The preferred hydrostatic drive system activates either piston forcing the high speed clutch plates to engage in a high speed mode and secure the clutch assembly to transfer torque directly from the input sun gear/shaft. To prevent slippage, an engaging/disengaging locking pin is employed when the high speed clutch is engaged. Thus, the two speed gear box includes means for selectively engaging each of the low speed and high speed clutches.

In the low range, the ring gear is locked to the gear casing via the low speed clutch. This provides a speed reduction of approximately 2:1 in the preferred embodiment from input to output through the planetary gear sets. When conditions are correct, the high range clutch can be applied and the low range clutch released. This frees up the planetary system and torque is transferred directly from the input sun gear/shaft through high clutch. The high speed clutch is applied through the apply pressure piston, bearing, and multiple clutch plates. It is at this time the thrust occurs through the subject bearing.

The apply system, pressure, piston size, thrust bearing capacity, and clutch plates must be designed with sufficient capacity to carry the maximum input load. This will always occur at low input speeds. At higher speeds, the horsepower equation applies:

$$\text{Horsepower} = \text{Torque} \times \text{RPM}/5252$$

As the RPM increases, torque must proportionally decrease at a set horsepower. The life of the thrust bearing can be greatly enhanced by incorporating a control system that decreases the apply pressure behind the high speed clutch apply piston by using conventional and well known technology to sense the RPM speed into the drive system. The control system would be set to decrease the pressure in one or more RPM steps, the details of which would be determined during detailed engineering calculations involving trade offs between the number of pressure reduction steps required for adequate system life versus the expected operational characteristics of the end system. It is expected that only one reduction step would be required to provide adequate life in most real life systems. Thus, the thrust bearing will be unloaded via the invention as the input RPM increases to greatly increase the life of the thrust bearing.

The two speed gear box is particularly adapted for use in the mining and digging vehicles where low speed thrust is required for digging traction, and high speeds are required for haulage. Similarly, the two speed gearbox is also adapted for drilling machines where low speed thrust is required for drill cutting, and high speed thrust is required for drill mud and cuttings removal. It may also be used with a variety of other two speed gearbox applications.

In summary, the two speed gearbox thus provides a planetary gearbox assembly for use with any torque source. It may be adapted with an auxiliary gearbox having an input drive axle associated with the input coupling of two speed gearbox. The preferred auxiliary gearbox has multiple parallel shafts, a plurality of input shafts, a gear shaft with interlocking gears and an output drive shaft each operably associated to multiply torque inputs. The input shafts are driven by a plurality of drive motors to provide combination inputs from multiple sources to the auxiliary gearbox, which then provides a combined output, which is inputted into the two speed gearbox. One embodiment of the preferred two speed gearbox associated with an auxiliary gearbox adapts the output shaft of the two speed gearbox with an output yoke.

In another variation, the auxiliary gearbox is mounted normal the input drive axle of the two speed gearbox. This embodiment has the output drive shaft of the auxiliary gearbox mounted in line with the sun gear coupling of the two speed gearbox. The auxiliary drive shaft is operably associated with an in line engine mount and the shaft of a first drive motor. The auxiliary gearbox has another drive shaft off-set and operably associated with a second drive motor mounted parallel to the drive shaft of a second motor. In this preferred embodiment of the combination auxiliary gearbox and two speed gearbox, the first drive motor is a combustion engine, and the second drive motor is an electric motor to provide multiple engine inputs to the two speed gearbox.

In summary, the two speed gearbox connects to an axle operatively driven by a torque source associated with its sun gear of a central planetary gearing system via coupling means. Means for shifting from the first mode low gear ratio mode to a second high gear ratio mode are included via selective application of the low and high speed clutches to secure either the sun gear and/or the ring gear of the central planetary gearing system to provide a plurality of geared outputs relative to the torque inputs. Where additional torque ratios are required, an auxiliary gearbox may be included to provide the required input into the two speed gearbox from multiple drive sources.

DESCRIPTION OF THE ILLUSTRATED EMBODIMENTS

Figure 1:
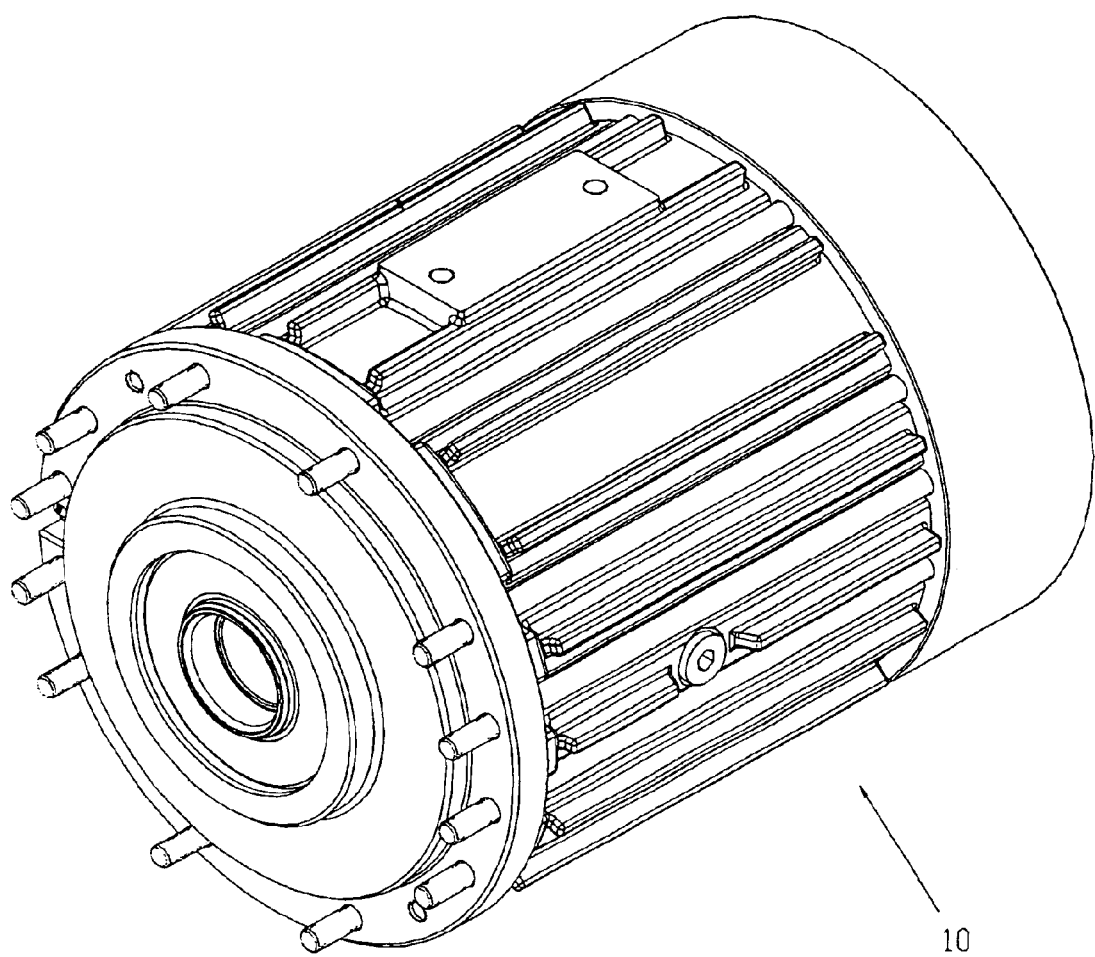
FIG. 1 is a perspective view of the two speed gear box of the present invention.

FIG. 1 is a perspective view of an assembled preferred embodiment of the two speed gearbox of the present invention 10. The two speed gearbox 10 is for use with any device that receives a torque input and provides a torque output.

Figure 2:
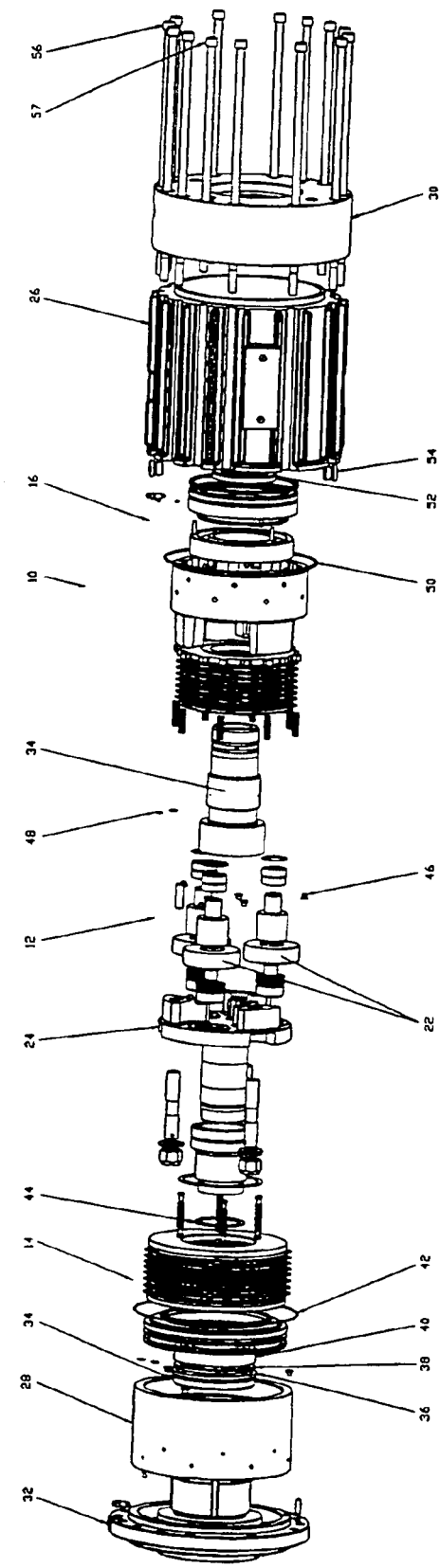
FIG. 2 is an exploded perspective view of the two speed gear box of FIG. 1.

FIG. 2 is an exploded view showing the components of the two speed gear box 10 embodiment shown in FIG. 1. The two speed gearbox 10 contains a central planetary gear assembly 12 aligned with an input drive shaft 18 shown in FIG. 3. The components of central planetary gear assembly 12 are selectively activated by low and high speed clutch assemblies 14, 16 to alter the torque input from a drive axle 18 rotatably aligned with the central planetary gear assembly 12. Said central planetary gear assembly 12 shown in FIGS. 2 through 8 provides two geared outputs via planetary gears 22 and three selectable operating modes. The central planetary gear assembly 12 and part of the high speed clutch carrier 16 are housed in a carrier mount 24 shown in more detail in FIGS. 4 and 5. The gear casing 26 has a generally cylindrical inside surface, within which the ring gear 28 of the planetary gear assembly 12 rotates until the low speed clutch assembly 14 is activated. A flange front mount subassembly 30 shown in more detail in FIG. 7 secures the end of the two speed gear box 10. A flange back full mount subassembly 32 shown in more detail in FIG. 6 secures the other end of the two speed gear box 10. Said subassembly components are secured together via a variety of interconnecting parts and components as shown in FIG. 2: internal retaining ring 36, bearing ring support 38, fourpoint bearing 40, O-ring 42, retaining ring 44, O-ring 48, O-ring 50, drain plug 54, hex soc. Cap screw 56 (mounts the 2 speed gearbox to the axle), hex soc. Cap Screw 57 (holds the 2 speed gearbox assembly together).

Figure 3:
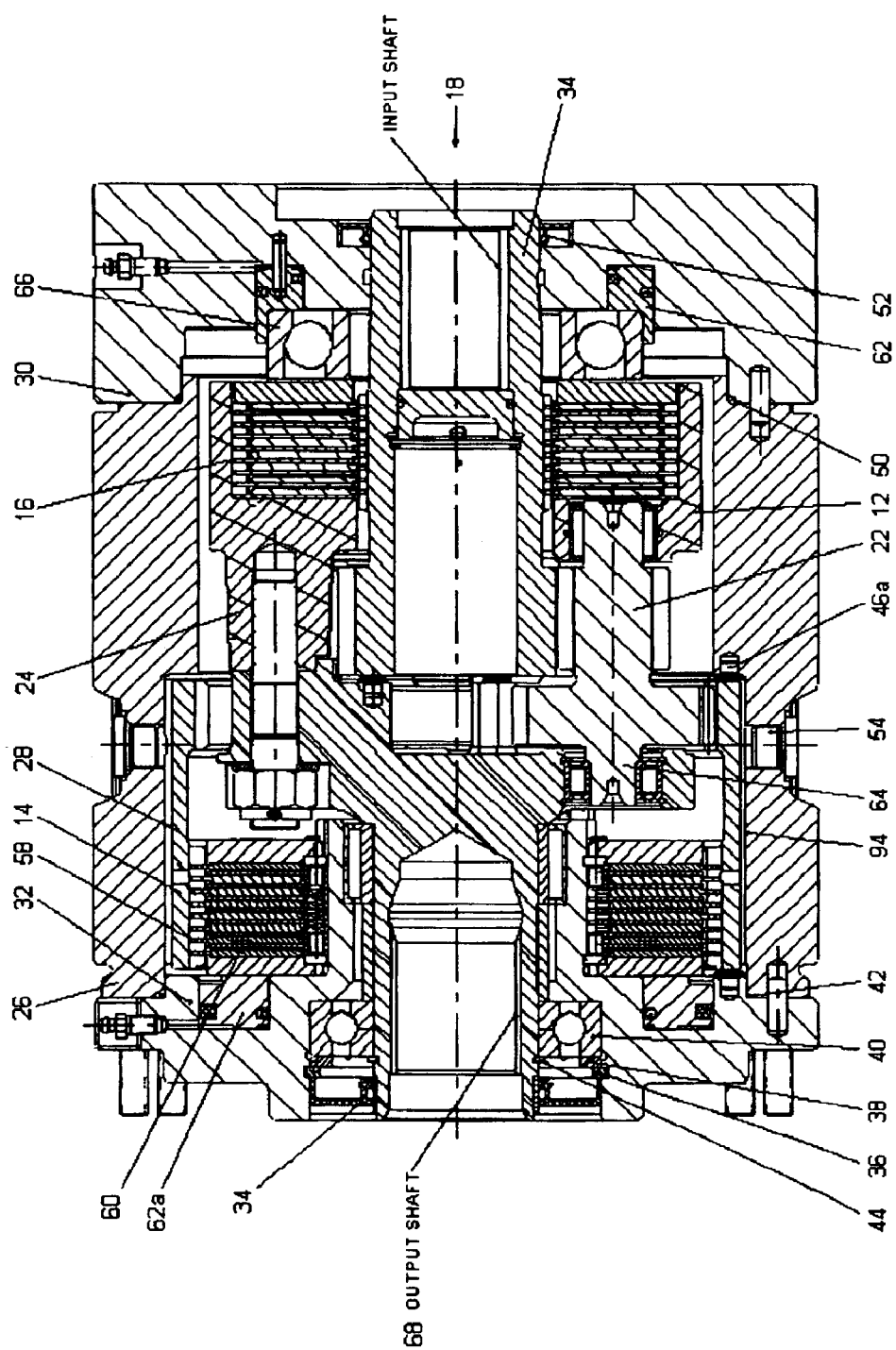
FIG. 3 is a cross sectional view of a preferred embodiment of the two speed gear box of the present invention.

FIG. 3 is a cross sectional view of the two speed gearbox of the embodiment shown in FIGS. 1 and 2 showing the components in more detail. The central planetary gear assembly 12 includes a sun gear subassembly 34 shown in more detail in FIG. 8, a number of planetary gears 22 arranged to provide dual gear ratios, a planetary gear carrier mount 24, and a ring gear 28. A low speed clutch assembly 14 attached to the gear casing 26 secures the ring gear 28, when activated. The low speed clutch assembly 14 comprises a plurality of non friction non rotating static clutch discs 58 attached to the gear casing 26 and operatively associated with rotating friction clutch discs 60 attached to the ring gear 28 to secure the ring gear 28 to the gear casing 26 when activated by hydraulically powered spring return piston 62a. With the low speed clutch assembly 14 activated, the planetary gears 22 orbit the sun gear 34 and drive the gear carrier 24 together about the pivot axis of the sun gear 34. When the planetary gears 22 orbit the sun gear 34, each of the planetary gears 22 rotates about its own pivot axis 64 as the planet gear carrier mount 24 rotates on the sun gear 34 axis (which is the same axis as the drive axis 18). Thrust buttons 46a are included for stability. Thus, as each of the planetary gears 22 rotate about its own rotational axis, the planetary gears 22 also translate their rotation about the axis of the sun gear 34.

Figure 5:
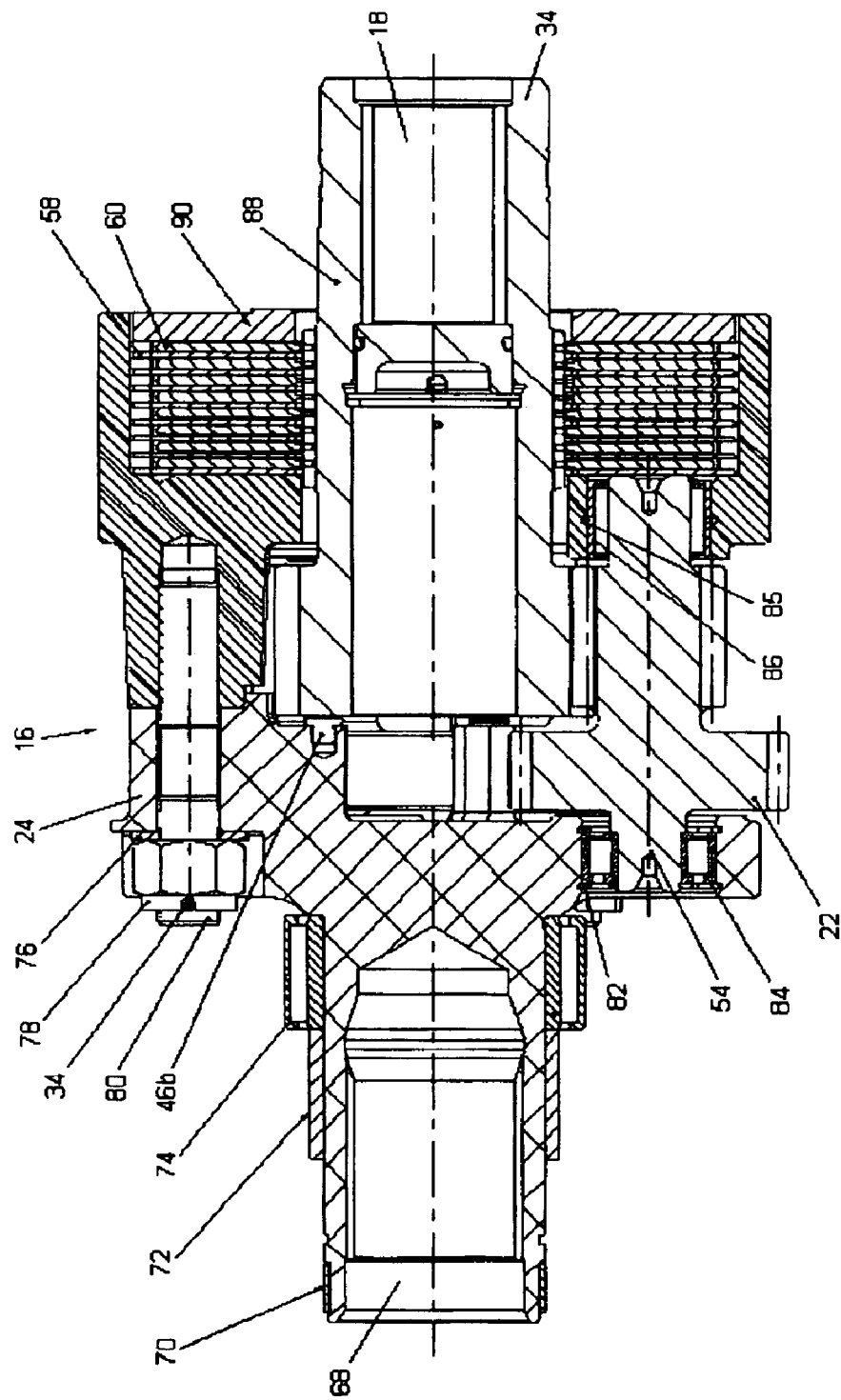
FIG. 5 is a cross section view of the carrier mount of the carrier mount shown in FIG. 4

The high speed clutch assembly 16 shown assembled in cross section in FIG. 5 comprises a plurality of non friction non rotating static clutch discs 58 attached to the carrier mount 24 and operatively associated with rotating friction clutch discs 60 attached to the sun gear 34 to secure the sun gear 34 to the carrier mount 24 when activated by an hydraulically powered spring return piston 62a. With the sun gear 34 secured, the drive shaft 18 rotates the planetary gears 22 to rotate the ring gear 26 to provide high speed torque rotation of the output shaft 68.

As these pistons for the clutch assemblies 14, 16 are stationary, they do not require dynamic seals, which are not subject to the extensive leakage problems with other dynamic clutches.

Figure 4:
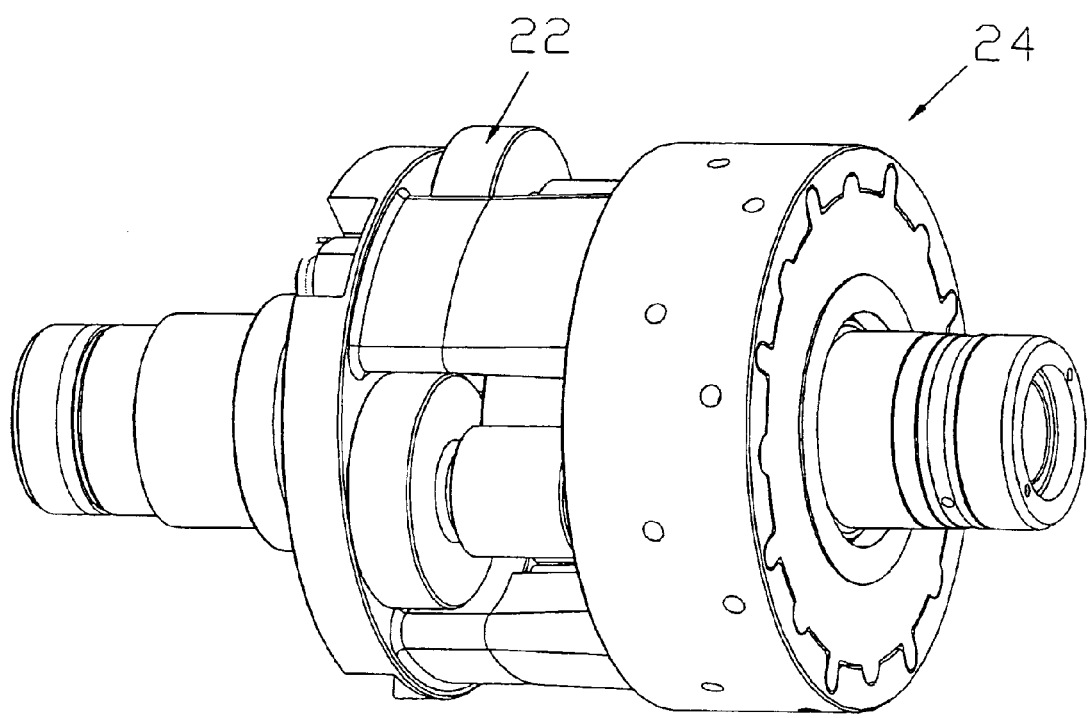
FIG. 4 is a perspective view of the carrier mount of the two speed gear box shown in FIG. 1.

FIG. 5 is a cross section view of the carrier mount 24 shown in FIG. 4 outlining in more detail additional part components and interrelationships. Starting from the left of the drawing, the output shaft 68 is surrounded by the carrier mount 24 with a wear sleeve 70 and spacer 72. A needle bearing 74 surrounds the carrier mount 24 proximate the output shaft 68. A washer 76 and nut 78 secured with a cotter pin 80 are associated with the carrier mount 24 and gears 22 of the clutch disc assembly 16. A retaining ring 82 at one end of the gears 22 and a needle bearing 86 and retaining ring 82 at the other end of the gears 22 allow them to turn about their axis. A sun gear shalt 88 surrounds the input shaft 18 proximate the gear planet 90. Again, thrust buttons 46b are included as are bearings 84 with grooves 85 for stability.

Figure 6:
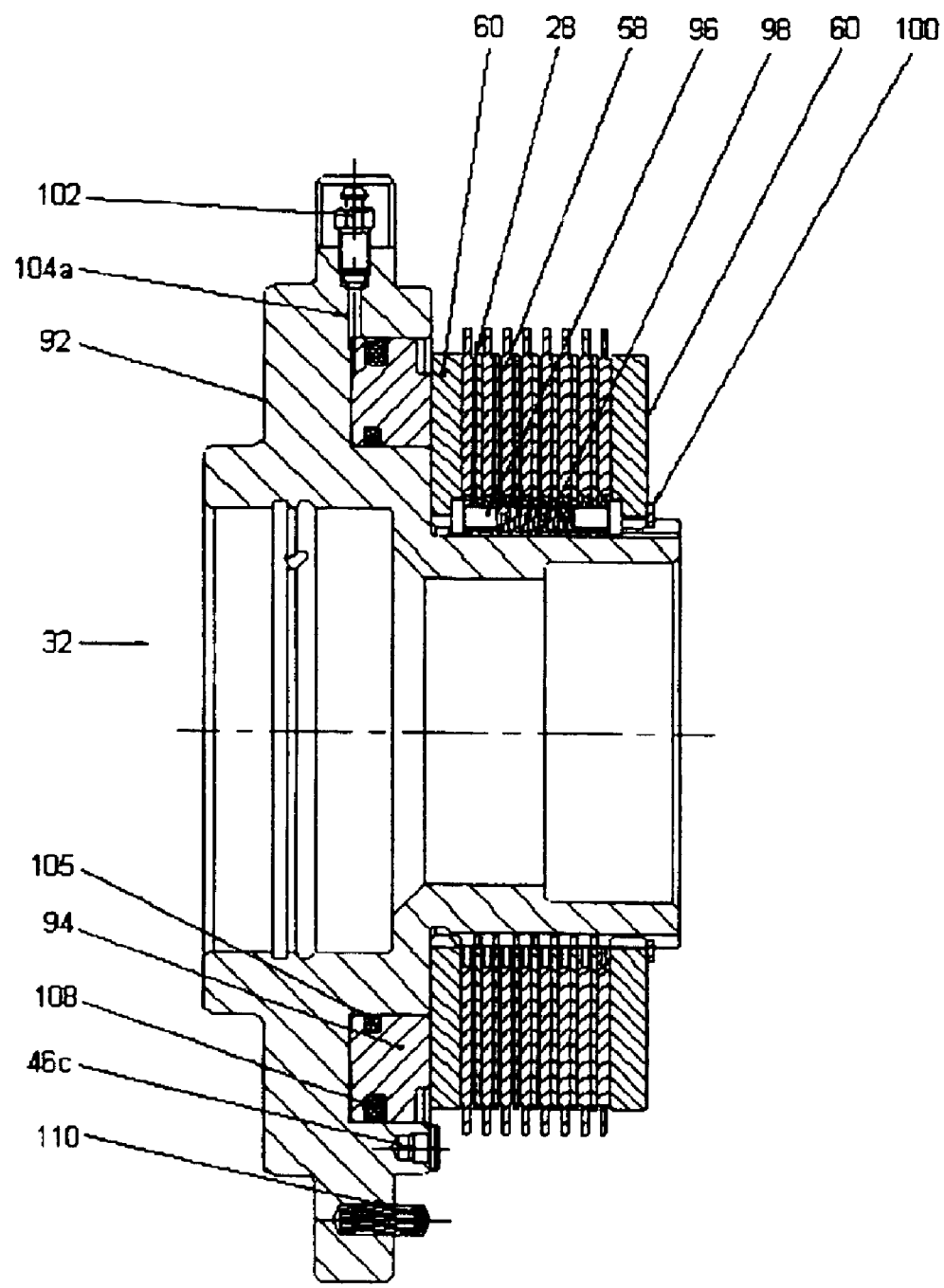
FIG. 6 is a cross sectional view of the end mount and low speed clutch subassembly of FIG. 2.

FIG. 6 is a cross sectional view of the flanged back end mount 32 of the low speed clutch subassembly of FIG. 2 showing additional part assemblies and interrelationships. The non rotating friction disks 58 are shown associated with spring support stud 96, and spring 98. The back flange 92 secures the low speed clutch assembly 14 via various seals, such as inner step seal 105 and outer step seal 108. An activating piston 94 activates the friction clutch discs 58 and non friction clutch discs 28 held via end plates 60 and retaining ring 100. A venting screw 102 is associated with the hydraulic circuit conduit 104a. A thrust button 46c and dowel pin 110 are also shown.

Figure 7:
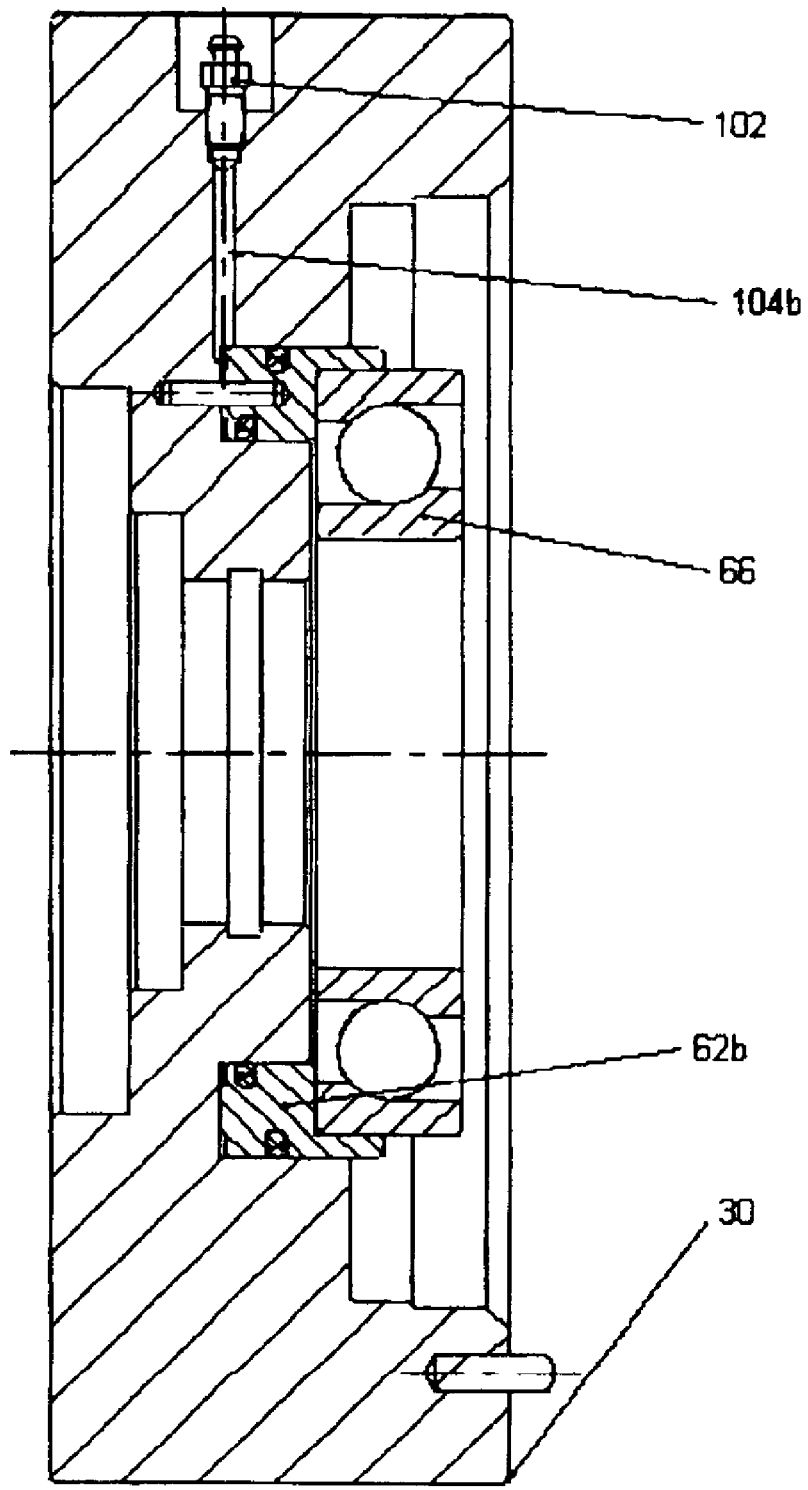
FIG. 7 is a cross sectional view of the end mount subassembly of FIG. 2.

FIG. 7 is a cross sectional view of the front end mount subassembly 30 of FIG. 2. A venting screw 102 of the hydraulic circuit 104b is shown, along with the angular contact bearing 66 and the hydraulically powered spring return piston 62b, and the complete front flange 30.

Figure 8:
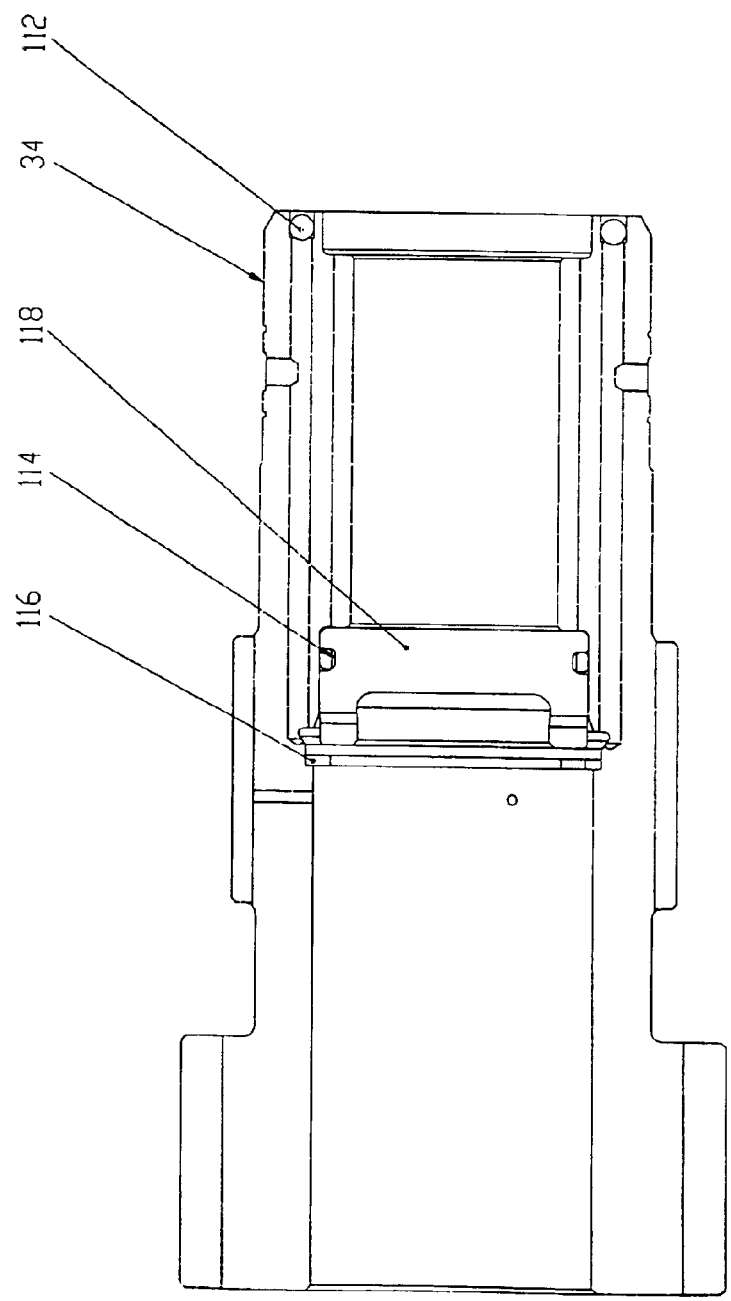
FIG. 8 is a cross sectional view of the shaft end subassembly of FIG. 2.

FIG. 8 is a cross sectional view of the shaft end subassembly of FIG. 2 shown in association with the sun gear 34. A ball 112, O-ring 114, and retaining ring 116 are shown associated with the plug 118 of the sun gear 34.

Figure 9:
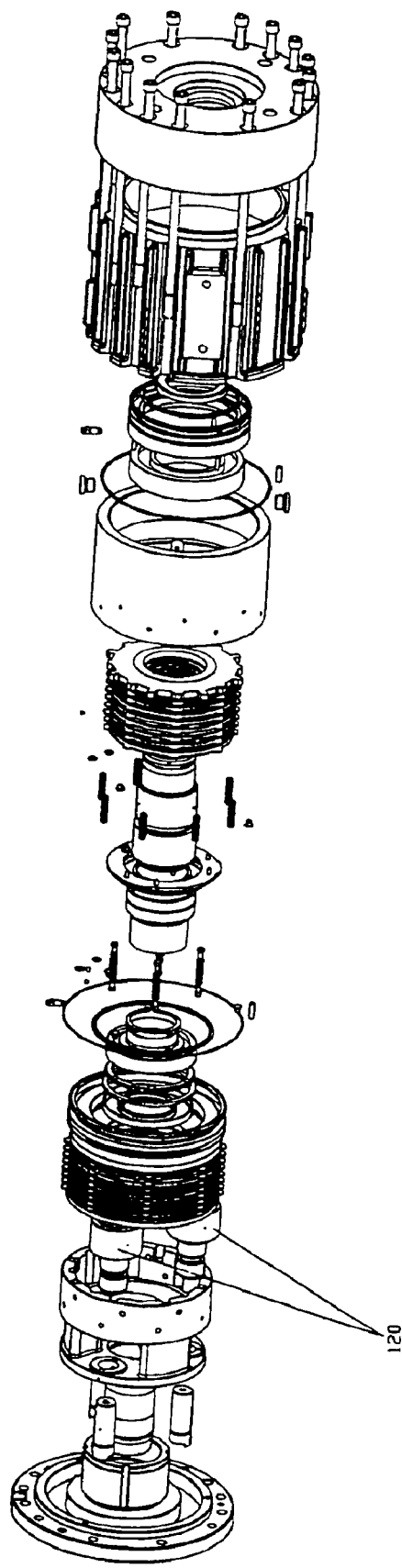
FIG. 9 is an exploded view of the two speed gearbox including a single planet carrier mount.
Figure 10:
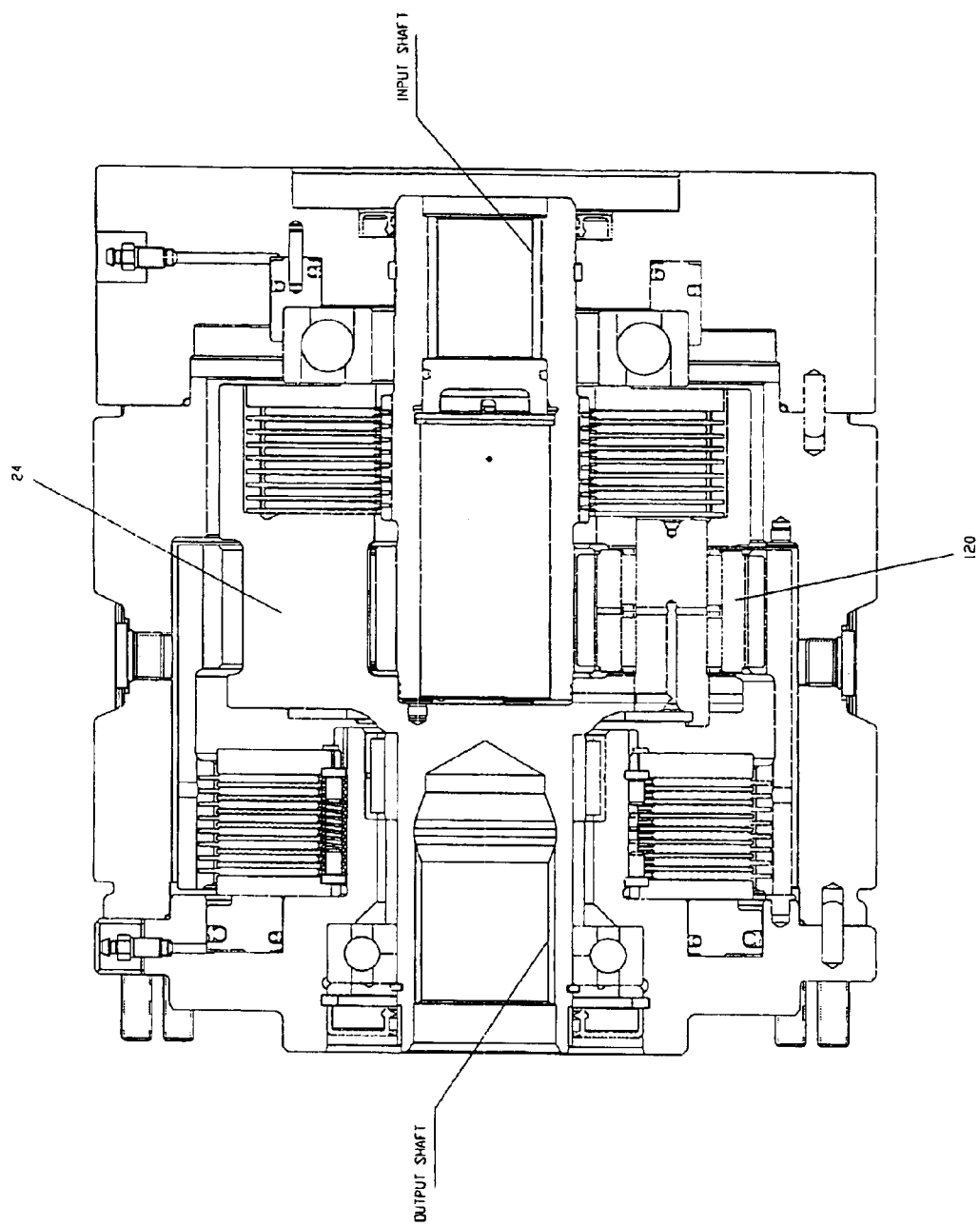
FIG. 10 is a cross sectional view of the two speed gearbox including the single planet carrier mount of FIG. 9.

FIG. 9 is an exploded view of the two speed gearbox including single planet carrier mount 120. FIG. 10 is a cross sectional view of the two speed gearbox including the single planet carrier mount 120 of FIG. 9, which employs substantially the same components as the double carrier mount previously discussed, with the exception of the single gear components 120, which is selectively activated to provide the desired gear ratio outputs.

Thus, the two speed gear box 10 operates as follows:

The sun gear 34 receives torque input from the drive axle 18 (unaffected by the high speed clutch 16). The ring gear 26 is rotatably mounted within the carrier mount 24 and supported on bearings in a conventional manner. By virtue of the high speed clutch 16, rotation of the drive axle 18 may be transmitted through the carrier mount 24. When the high speed clutch 16 is disengaged and the low speed clutch 14 is engaged, rotation of the sun gear 34 via torque input from the drive axle 18 causes the planetary gears 22 to orbit about the sun gear 34. By virtue of the gear carrier mount 24, this orbital motion causes rotation around the sun gear 34. The low speed clutch 14 holds the ring gear 26 in a fixed position. Rotation of the sun gear 34 in turn rotates the planetary gears 22.

Because the planetary gear carrier mount 24 is fixed, the planetary gears 22 rotate about their respective axes and orbit about the sun gear 34. The rotation of the planetary gears 22 is transmitted to the output shall via the ring gear 28. In this mode of operation, there is an increase in gear ratio, which drives the output shaft 68 at a relatively low speed with relatively high driving torque.

In another mode of operation, the low speed clutch assembly 14 is disengaged, and the high speed clutch assembly 16 is engaged. Rotation of the sun gear 34 via the drive axle 18 is transmitted directly to the carrier mount 24, which is free to rotate on bearings about the drive axis 18 (because the low speed clutch 14 is disengaged). The high speed clutch 16 couples the planetary gear carrier mount 24 to the sun gear 34 when the high speed clutch 16 is engaged. Thus, as the sun gear 34 rotates, the planetary gears 22 translate about the drive axis 18 in conjunction with the rotation of the sun gear 34. The planetary gears 22 do not rotate about their respective axes. By virtue of the planetary gear carrier 24 attached to the planetary gears 22, the translation of the planetary gears 22 is transmitted from the sun gear 34 via the shaft 18. In turn, rotation of the sun gear 34 rotates the planetary gears 22, thus rotating the output shaft 68. In this mode of operation, there is no gear reduction, resulting in a relatively high speed and lower torque transmission to the output shaft 68. With both clutch assemblies 14, 16 disengaged, a neutral mode results as the output shaft 68 is freely rotatable with respect to the drive axle 18.

Thus, selectively engaging and disengaging the clutch assemblies 14 and 16 provides two speed gear ratios (low and high) and three modes of operation for the output shaft 19 relative to the drive axle 18.

Based on size constrains and planetary gear equations, which are well known in the art, the speed reduction and torque increase ratios through the two speed gear box 10 are selected based on gear teeth ratios:

$$\frac{NR2}{NS2}$$

Where:
NR2 is the number of gear teeth on the ring gear 26
NS2 is the number of gear teeth on the sun gear 21.

If these gear ratios are not sufficient to provide the desired outputs, a single carrier mount design is employed to provide higher gear ratios as shown in the FIGS. 9 and 10 of the two speed gearbox 10 including double carrier mounts 24 to provide a 3:65 to 1 gearbox ratio. FIG. 10 provides a cross sectional view of the assembled two speed gearbox including the single carrier mount 24 of FIG. 9.

Figure 11:
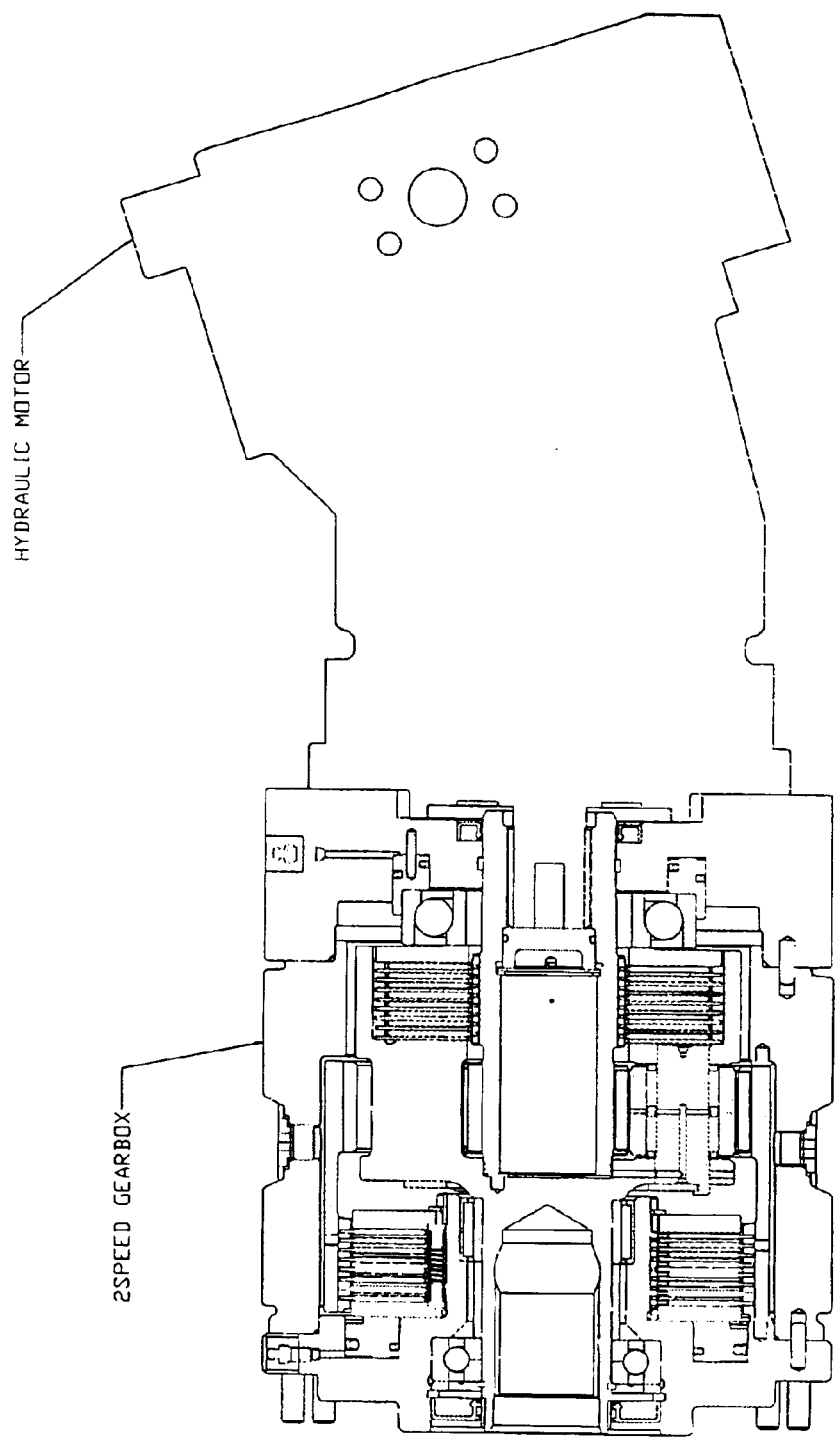
FIG. 11 is a cross sectional view of the two speed gearbox associated with an hydraulic drive motor.

The two speed gearbox 10 may be associated with any torque drive source. However, FIG. 11 discloses a preferred embodiment with the two speed gearbox operably associated with an hydraulic motor.

Thus, the possible reduction ratios for the two speed gear box 10 range from a gear ratio between 2 and 3 when a double planetary gear assembly is employed. For lower gear ratios greater than 3, the two speed gear box employs the single carrier mount assembly shown in FIGS. 9 and 10.

Figure 12:
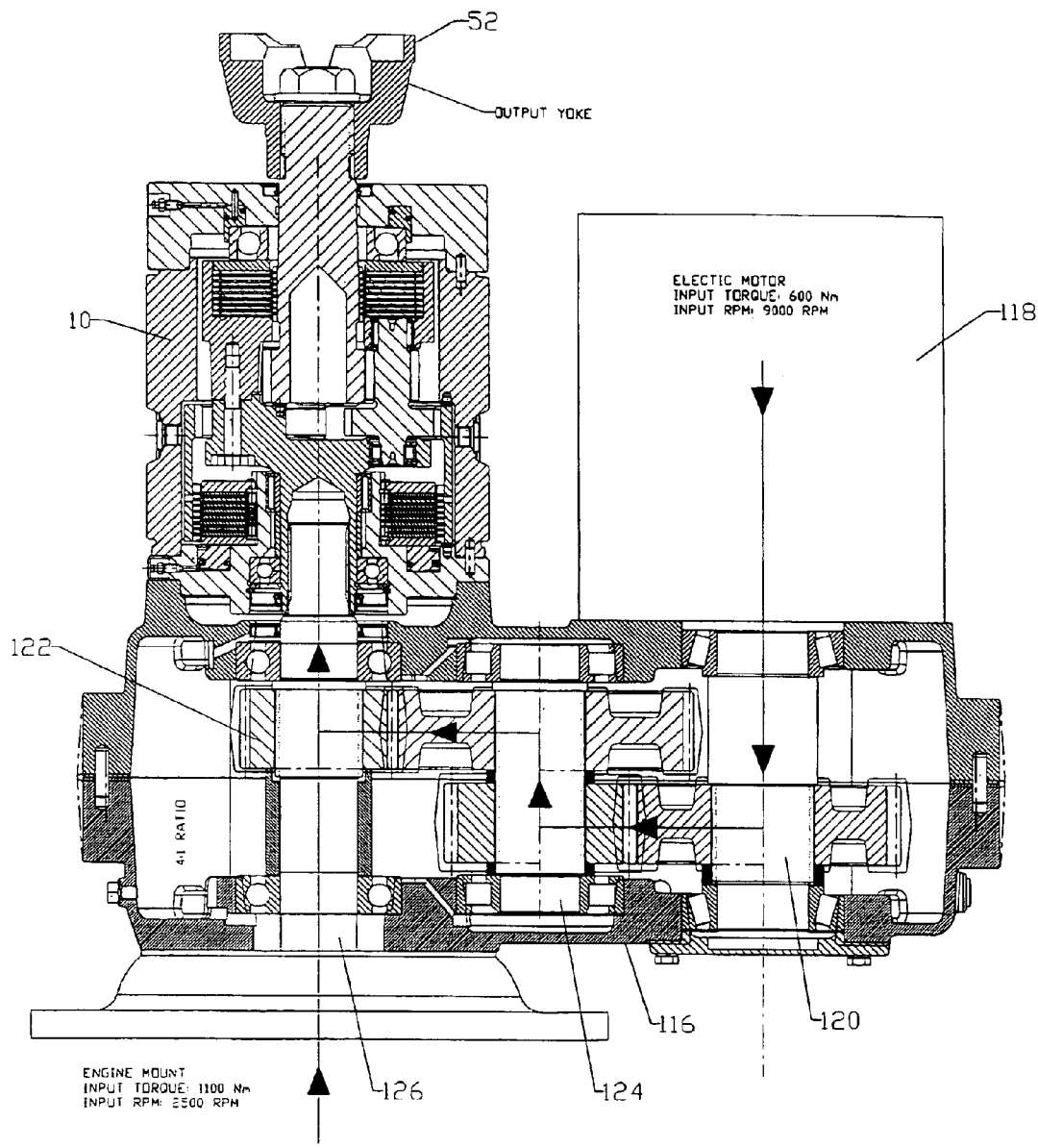
FIG. 12 is a preferred embodiment of the invention adapted with hybrid drive.

If this is still not sufficient to provide the desired two speed gearbox operating ratios, an auxiliary gearbox 116 may be included to adjust the drive shaft inputs from various sources as shown in FIG. 12.

Figure 13:
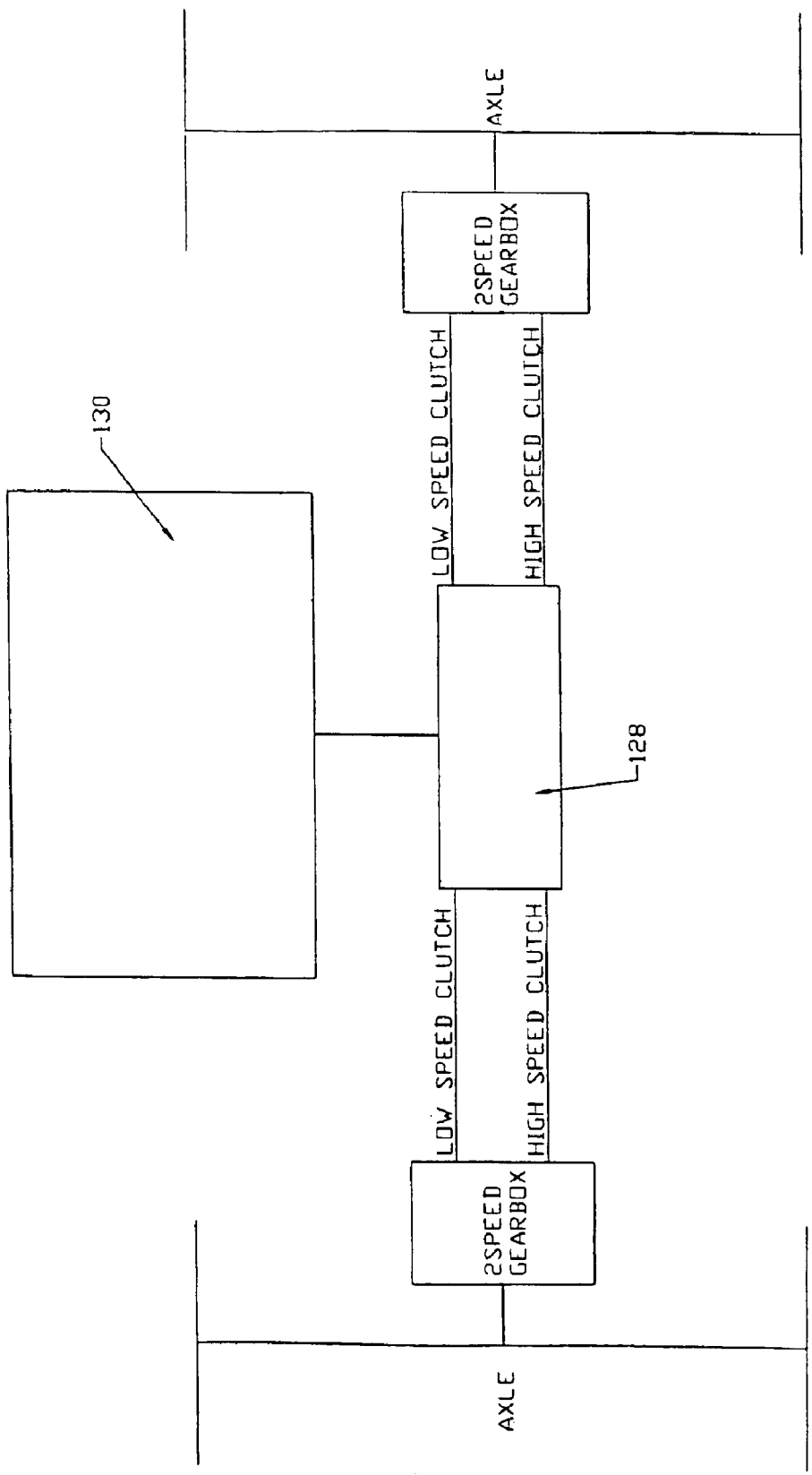
FIG. 13 is a schematic diagram of a typical hydraulic circuit.

For example, FIG. 12 is a cross sectional view of the two speed gearbox 10 associated with an auxiliary gearbox 116. The auxiliary gearbox 116 shown has an electric motor 118 associated with its input shaft 120. A gearing system 122 with a parallel gear shaft 124 is operably associated with the input shaft 120 and an output drive shaft 126 to increase or decrease the torque output of the drive shaft 126. The auxiliary drive shaft 126 is coupled to the sun gear 34 of the two speed gearbox 10. The two speed gearbox 10 then provides two speed reduction to the output shaft yoke 52, FIG. 13 is an exemplary diagram of a hydrostatic activation circuit of the two speed gear box of the present invention.

The low speed clutch 14 and/or the high speed clutch assemblies 16 may be engaged automatically or manually. Preferably, the low speed gear ratio and the high speed gear ratio are activated automatically. Automatic shifting of the two speed gear box 10 into high speed or low speed gear ratios may require information on speed and torque status of the drive. An electronic controller (not shown) may receive input data on engine throttle, vehicle speed, engine speed, vehicle load, wheel traction, terrain topography, the torque and speed status of the other wheels, and perhaps various other parameters to determine shifting the two speed gear box 10 from high speed to low speed and vice versa when required. The electronic controller then transmits shifting commands to actuators to engage or disengage the low speed clutch 14 and/or the high clutch 16 to shift the two speed gear box 10 into the desired gear ratio. The clutch assemblies 14, 16 are actuated by methods well known in the art, such as but not limited to, hydraulic or electro-mechanical actuation.

The disclosed two speed two speed gear box 10 provides a cost effective way to extend the torque and speed range of mechanical, hydrostatic and electric drives. In particular, the two speed gear box 10 is well suited to hydrostatic and electric drives because such drives can change the direction of rotation of the drive shafts without requiring a reverse shilling mechanism. The applications in which the disclosed two speed gearbox 10 can be used range from small appliances to large industrial vehicles. The potential applications of the disclosed two speed gear box 10 include, by way of example rather than limitation, domestic appliances such as sink mounted garbage disposal units, food blenders, and power tools; industrial applications such as winches, hoists, and material handling equipment; and, vehicle applications such a golf buggies, agricultural tractors, earthmoving equipment, forklifts, and personnel carriers.

Application of the disclosed two speed gear box 10 to hydrostatic drive systems may offer certain operational advantages due to the fact that many such drive systems have a limited torque and speed range. Referring to FIG. 13, a hydrostatic drive system typically includes a hydrostatic pump 128 that is powered by a vehicle engine 130. The hydrostatic pump 128 transmits power to the drive shaft through hydrostatic drive lines (not shown). Hydrostatic drive systems are typically favored in some industrial applications and heavy equipment because such drive systems may offer several attractive and important operating features when used in such application. Some of the advantages of hydrostatic drive systems include for example, the ability to provide a wide range of speed/torque variation over their operating range, while the prime mover or engine runs at its most efficient constant speed. Further, such drive systems may operate in reverse at a controlled speed and remain unaffected by output loads, and may respond more rapidly than mechanical or electrical transmissions with comparable power ratings. However, hydrostatic drive systems have a limited speed/torque range compared to multi-ratio mechanical transmissions. The practical limit of the speed/torque range for hydrostatic drive systems is 9:1, where vehicle applications typically require a speed/torque range of 15:1.

As an example, one industrial vehicle that may benefit from above noted advantages of hydrostatic drive systems is a tractor scraper. To cut and load the soil a tractor scraper must provide high traction forces to the ground at low speed. To be effective as a haulage vehicle a tractor scraper must have a comparatively high road speed capability. Also, because of typically poor ground conditions in a tractor scraper's work environment, all wheels must be driven during the loading cycle. The two speed gearbox 10 provides a mechanism for traction control, which is applicable to any type of vehicle including passenger automobiles. If one wheel loses traction and spins, that wheel can be placed in freewheel mode and the power applied to the other wheels that still have traction. Another feature is that during high steering angle turns power turning capability can be provided by use of the freewheel mode on the inside rear wheel.

The foregoing description of the illustrated embodiments is not intended to limit the scope of the appended claims. The claims themselves contain those features deemed essential to the invention.

We claim:

1. A two speed gearbox mounted in-line for driving a hub, the gear box comprising:
    a gearbox casing adapted to journal mount about an input drive shaft and output shaft;
    a central planetary gear carrier assembly rotatably mounted within the gearbox casing comprising:
    a sun gear to accommodate and be driven by the input drive shaft;
    a plurality of planetary gears;
    a ring gear associated with a coupling to accommodate and drive the output shaft;
    a planetary gear carrier, the planetary gear carrier supporting and interconnecting the planetary gears;
    a low speed clutch assembly with a plurality of fixed discs mounted to the gearbox casing adapted to selectively engage a plurality of rotating discs there between attached to the ring gear of the plane gear carrier assembly;
    a high speed clutch assembly with a plurality of fixed discs housed within a carrier mount adapted to selective engage a plurality of rotating discs there between attached to the sun gear of the planetary gear carrier assembly; and
    an engaging/disengaging high speed hydraulically powered spring return piston operably associated with the high speed clutch assembly having a locking pin to hydraulically secure the planetary gear assembly to the casing to prevent slippage, and selectively secure the sun gear of the planetary gear carrier when engaged;
    an engaging/disengaging low speed hydraulically powered spring return piston attached to the casing and operably associated with the low speed clutch assembly to selectively hydraulically secure the ring of the planetary gear assembly, when engaged; and
    activation means to selectively activate the desired high speed and low speed hydraulically powered spring return pistons to provide the desired operating speed mode.

2. The two speed gearbox of claim 1, wherein the activation means comprises an hydraulic circuit for selectively engaging each of the high speed clutch and the low speed clutch assemblies, and wherein the planetary gear assembly defines a plurality of operating modes comprising:
    a neutral mode defined by disengaging the low speed clutch assembly and the high speed clutch assembly;
    a low speed mode defined by engaging the low speed clutch assembly and disengaging the high speed clutch assembly; and
    a high speed mode defined by disengaging the low speed clutch assembly and engaging the high speed clutch assembly.

3. The two speed gearbox of claim 2, including a control system associated with the activation means that decreases the apply pressure behind the high speed hydraulically powered spring return piston, and bearings associated with the clutches assemblies wherein the thrust load through the bearing associated with the high speed clutch assembly is directly proportional to the torque input.

4. The two speed gear box of claim 1, wherein at least one of the low speed clutch assembly and the high speed clutch assembly is adapted to be engaged and disengaged automatically.

5. The two speed gearbox of claim 1, wherein the planetary gear carrier has a single planetary gear assembly (simple planetary) which provides a gear ratio greater than 3:1.

6. The two speed gearbox of claim 1, including a first carrier mount assembly which houses the planetary gear assembly and the high speed clutch assembly.

7. The two speed gearbox of claim 6, wherein the first carrier mount assembly includes a generally cylindrical interior surface, a portion of the interior surface defining the ring gear of the planetary gear assembly.

8. The two speed gearbox of claim 1, wherein the plurality of planetary gears of the carrier mount assembly are operatively connected to the sun gear of the planetary gear assembly, such that the sun gear rotates about a drive axis in conjunction with the gear carrier of the planetary gear assembly.

9. The two speed gearbox of claim 6, wherein the carrier mount includes a dual planetary gear assembly with first and second segments having different gear ratios aligned such that the sun gear selectively engages the desired segment of the dual planetary gear assembly resulting in a ration of 1:1 in high gear when the high gear clutch is engaged regardless of planetary configuration, and the engagement of the low gear clutch results in a a gear ratio from 2 to 3:1 when the planetary arrangement is compound, and in excess of 3:1 when the planetary arrangement is single (simple).

10. The two speed gearbox of claim 1, wherein the first planetary gear assembly and the second planetary gear assembly have different gear ratios.

11. The two speed gearbox of claim 1, including universal face plates with couplings attached at either end of the gear box assembly adapted to connect either end of the gear box with a splined drive shaft to provide either an increasing or decreasing torque output to the output shaft.

12. The two speed gearbox of claim 1, including an auxiliary gearbox having an input drive shaft associated with the input coupling of two speed gearbox and multiple drive shafts with interlocking gears and drive shafts associated with a plurality of drive motors to provide combination inputs to the two speed gearbox from multiple sources.

13. The two speed gearbox of claim 12 wherein the output shaft of the two speed gearbox is an output yoke.

14. The two speed gearbox of claim 12 associated with a hybrid drive system, wherein the auxiliary gearbox is mounted normal to the input drive shaft, with one motor drive shaft mounted in line with the sun gear coupling of the two speed gearbox, which is operably associated with an in line engine mount and shaft of a first drive motor, and another drive shaft off-set and operably associated with a second drive motor mounted parallel to drive shaft of the combustion motor.

15. The two speed gearbox of claim 14, wherein the first drive motor is a combustion engine, and the second drive motor is an electric motor.

16. The two speed gearbox of claim 14, wherein the auxiliary gearbox includes a central planetary gear carrier assembly rotatably mounted within an auxiliary gearbox casing mounted between the shaft couplings associated with the first and second motor drive shafts comprising:

a sun gear with a coupling to accommodate and be driven by the input first motor drive shaft;

a plurality of planetary gears;

a ring gear associated with a coupling to accommodate and drive the input of the second motor drive shaft; and a planetary gear carrier, the planetary gear carrier supporting and interconnecting the planetary gears associated with the input shaft of the two speed gearbox to provide combined drive input to the two speed gearbox from multiple first and second motor sources.

17. The two speed gearbox according to claim 16, wherein the auxiliary planetary gear carrier assembly has the same ratio as the drive input from the first and second motor sources.

18. The two speed gearbox according to claim 16, wherein the auxiliary planetary gear carrier assembly multiplies the motor drive inputs from the first and second motor sources into the two speed gearbox.

19. The two speed gearbox according to claim 16, wherein the drive shaft couplings of the auxiliary gearbox are adapted interchangeably connect to different drive motors.

* * * * *